US009273829B2

(12) United States Patent
Weickert et al.

(10) Patent No.: US 9,273,829 B2
(45) Date of Patent: Mar. 1, 2016

(54) SORPTION STORE FOR STORING GASEOUS SUBSTANCES

(71) Applicant: BASF SE, Ludwigshafen (DE)

(72) Inventors: Mathias Weickert, Ludwigshafen (DE); Stefan Marx, Dirmstein (DE); Ulrich Müller, Neustadt (DE); Peter Renze, Mannheim (DE)

(73) Assignee: BASF SE, Ludwigshafen (DE)

( * ) Notice: Subject to any disclaimer, the term of this patent is extended or adjusted under 35 U.S.C. 154(b) by 142 days.

(21) Appl. No.: 14/048,231

(22) Filed: Oct. 8, 2013

(65) Prior Publication Data

US 2014/0097099 A1 Apr. 10, 2014

Related U.S. Application Data

(60) Provisional application No. 61/711,231, filed on Oct. 9, 2012.

(51) Int. Cl.

| | |
|---|---|
| ***B01D 53/02*** | (2006.01) |
| ***F17C 11/00*** | (2006.01) |
| ***F17C 13/00*** | (2006.01) |

(52) U.S. Cl.
CPC ............... *F17C 11/007* (2013.01); *F17C 11/00* (2013.01); *F17C 13/005* (2013.01)

(58) Field of Classification Search
CPC ...... F17C 11/00; F17C 11/005; F17C 11/007; F17C 13/005; B01D 53/02; B01D 53/04
USPC .......... 95/90; 96/108, 146; 206/0.7; 502/526; 423/648.1, 658.2; 429/515; 141/4
See application file for complete search history.

(56) References Cited

U.S. PATENT DOCUMENTS

| | | | | |
|---|---|---|---|---|
| 4,165,569 | A * | 8/1979 | Mackay | 34/416 |
| 4,859,427 | A * | 8/1989 | Konishi et al. | 422/159 |
| 4,964,524 | A * | 10/1990 | Halene | 220/586 |

(Continued)

FOREIGN PATENT DOCUMENTS

| | | |
|---|---|---|
| CN | 107865 | 1/2002 |
| CN | 201193780 | 2/2009 |

(Continued)

OTHER PUBLICATIONS

Wärmeleitung und Dispersion in durchströmten Schüttungen, *VDI Wärmeatlas*, vol. 10, Sec. Mh3 2006, 4 pages.
English Machine Translation of "Wärmeleitung und Dispersion in durchströmten Schüttungen, *VDI Warmeatlas*, vol. 10, Sec. Mh3 2006," 6 pages.

(Continued)

*Primary Examiner* — Frank Lawrence
(74) *Attorney, Agent, or Firm* — Servilla Whitney LLC

(57) ABSTRACT

Describes is a sorption store for storing gaseous substances. The sorption store for storing gaseous substances comprises a closed tank and a feeding device, which comprises a passage through the tank wall, through which a gas can flow into the tank. The tank has inside it at least one separating element, which is configured in such a way that the interior of the tank is divided into at least one pair of channels comprising two parallel running channel-shaped compartments, the ends of which are in connection with one another in each case by way of a common space, each channel-shaped compartment being filled at least partially with an adsorption medium. The feeding device is designed in such a way that inflowing gas is diverted almost exclusively into one of the two compartments of each pair of channels.

15 Claims, 6 Drawing Sheets

(56) References Cited

U.S. PATENT DOCUMENTS

| | | | | |
|---|---|---|---|---|
| 5,851,270 | A | 12/1998 | Olander | |
| 6,638,348 | B2 * | 10/2003 | Kuriiwa et al. | 96/146 |
| 7,323,043 | B2 * | 1/2008 | Finamore | 96/146 |
| 7,651,554 | B2 * | 1/2010 | Tan et al. | 96/108 |
| 7,652,132 | B2 | 1/2010 | Yaghi et al. | |
| 8,051,977 | B2 | 11/2011 | Fujita et al. | |
| 8,197,988 | B2 * | 6/2012 | Kim et al. | 429/515 |
| 2008/0168776 | A1 * | 7/2008 | Arnold et al. | 62/46.1 |
| 2010/0006454 | A1 | 1/2010 | Gruenwald et al. | |
| 2010/0219087 | A1 * | 9/2010 | Fujita et al. | 206/0.7 |

FOREIGN PATENT DOCUMENTS

| | | |
|---|---|---|
| CN | 101680601 | 3/2010 |
| DE | 102007058673 | 6/2009 |

OTHER PUBLICATIONS

Zhao, Zhenxia et al., Adsorption and Diffusion of Carbon Dioxide on Metal-Organic Framework (MOF-5), *Ind. Eng. Chem. Res.*, vol. 48, No. 22 2009, 10015-10020.

PCT International Search Report in PCT/IB2013/059029, mailed Feb. 26, 2014, 5 pages.

* cited by examiner

SORPTION STORE FOR STORING GASEOUS SUBSTANCES

CROSS-REFERENCE TO RELATED APPLICATIONS

This application claims the benefit of priority under 35 U.S.C. §119(e) to U.S. Provisional Application No. 61/711,231, filed Oct. 9, 2012, the entire content of which is incorporated herein by reference in its entirety.

TECHNICAL FIELD

The present invention relates to a sorption store for storing gaseous substances. Specifically, the present invention relates to a sorption store comprising a closed tank at least partially filled with an adsorption medium and comprising a feeding device, which comprises a passage through the tank wall, through which a gas can flow into the tank. The invention also relates to a method for filling the sorption store and a method for removing gas from the sorption store.

BACKGROUND

Along with pressurized gas tanks, sorption stores are increasingly being used nowadays for the storage of gases for stationary and mobile applications. Sorption stores generally comprise an adsorption medium with a large internal surface area, on which the gas is adsorbed and thereby stored. While a sorption store is being filled with gas, the adsorption causes the release of heat, which has to be removed from the store. By analogy, when gas is removed from the store, heat has to be supplied for the process of desorption. Therefore, thermal management is of great importance when designing sorption stores.

The patent application U.S. 2008/0168776 A1 describes a sorption store for hydrogen, which comprises an outer tank which is thermally insulated from the surroundings and arranged inside which are a number of pressure vessels, which comprise an adsorption medium. The intermediate spaces between the pressure vessels are filled with a cooling fluid, in order to allow the heat occurring during the adsorption to be removed.

The patent application DE 10 2007 058 673 A1 describes an apparatus for storing gaseous hydrocarbons, which comprises an insulated tank filled with an adsorption medium. Provided in the tank is a heating element, which is activated by means of a control system in such a way that, when gas is being removed, a minimum pressure is maintained for as long a time as possible.

One disadvantage of known sorption stores is that the filling with gas proceeds only slowly. In particular in the case of mobile applications, for example in motor vehicles, this disadvantage is particularly serious.

SUMMARY

A first embodiment pertains to a sorption store for storing gaseous substances, comprising a closed tank and a feeding device, which comprises a passage through the tank wall, through which a gas can flow into the tank, wherein the tank has inside it at least one separating element, which is configured in such a way that the interior of the tank is divided into at least one pair of channels comprising two parallel running, channel-shaped compartments, the ends of which are in connection with one another in each case by way of a common space, each channel-shaped compartment being filled at least partially with an adsorption medium, and wherein the feeding device is designed in such a way that inflowing gas is diverted almost exclusively into one of the two compartments of each pair of channels.

In a second embodiment, the sorption store of the first embodiment is modified, wherein the channel walls of the channel-shaped compartments are of a double-walled configuration for being flowed through by a heat transfer medium.

In a third embodiment, the sorption store of the first and second embodiments is modified, wherein the distance between the channel walls in each channel-shaped compartment is from 2 cm to 8 cm.

In a fourth embodiment, the sorption store of the first through third embodiments is modified, wherein the distances between the channel walls in the channel-shaped compartments of each pair of channels differs by no more than 40%, from one another.

In a fifth embodiment, the sorption store of the first through third embodiments is modified, wherein the cross-sectional areas of the channel-shaped compartments is chosen such that, during the filling of the tank with gas, the flow rates in the channel-shaped compartments of each pair of channels differ by no more than 20% from one another.

In a sixth embodiment, the sorption store of the first through fifth embodiments is modified, wherein, when viewed in cross section, the contours of the tank inner wall and of the at least one separating element and, if applicable, the number of separating elements are substantially conformal.

In a seventh embodiment, the sorption store of the first through sixth embodiments is modified, wherein the tank is cylindrically designed and the at least one separating element is arranged substantially coaxially in relation to the cylinder axis.

In an eighth embodiment, the sorption store of the seventh embodiment is modified, wherein the at least one separating element is formed as a tube, so that the space inside the tube forms a first channel-shaped compartment and the space between the tube outer wall and the tank inner wall or possibly between the tube outer wall and a further separating element forms a second, annular-channel-shaped compartment.

In a ninth embodiment, the sorption store of the first through eighth embodiments is modified, wherein the porosity of the adsorption medium is at least 0.2.

In a tenth embodiment, the sorption store of the first through ninth embodiments is modified, wherein the adsorption medium is in the form of a bed of pellets, and the ratio of the permeability of the pellets to the smallest pellet diameter is at least $10^{-14}$ $m^2/m$.

In an eleventh embodiment, the sorption store of the first through tenth embodiments is modified, wherein the adsorption medium comprises zeolite, activated carbon, or metal-organic frameworks.

A second aspect of the present invention pertains to a method for filling a sorption store. In a twelfth embodiment, a method for filling the sorption store of the first embodiment with a gas, wherein, in a first step, gas is supplied in an amount such that a pressure in the store of at least 30% of a predetermined final pressure is reached as quickly as possible, and wherein subsequently, in a second step, the supplied amount of gas is varied in such a way that the variation of the pressure in the store approximates to the adsorption kinetics of the adsorption medium until the predetermined final pressure in the store is reached after a predetermined time period.

In a thirteenth embodiment, the method of the twelfth embodiment is modified, wherein the temperature of the gas stream is measured in at least one channel-shaped compartment and the amount of gas supplied to the sorption store is adapted as required in such a way that a predetermined maximum temperature in the channel-shaped compartment is not exceeded.

Another aspect of the present invention pertains to a method for removing gas from a sorption store. In a fourteenth embodiment, a method for removing gas from a sorption store of the second through eleventh embodiments, wherein the channel walls are flowed through by a heat transfer medium, the temperature of which is greater than the temperature of the gas in the channel-shaped compartments.

In a fifteenth embodiment, the method of the twelfth through fourteenth embodiments is modified, wherein the gas substantially comprises methane.

DETAILED DESCRIPTION

Figure 1:
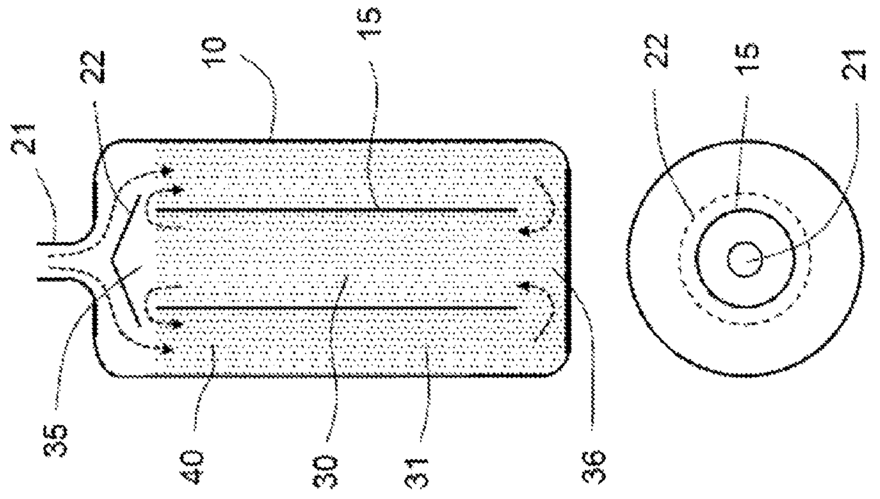
FIG. 1: shows an embodiment of a sorption store according to the invention with a deflecting element for inflowing gas

Before describing several exemplary embodiments of the invention, it is to be understood that the invention is not limited to the details of construction or process steps set forth in the following description. The invention is capable of other embodiments and of being practiced or being carried out in various ways.

Provided is an apparatus for storing gaseous substances that allows quick filling with gas and improved removal of gas. At the same time, the apparatus according to one aspect of the invention is of a simple construction and requires little electrical energy during operation. Further provided is a method for quickly and efficiently filling the store and for removing gas from the store.

According to one or more embodiments of a first aspect of the present invention, the sorption store according to the invention for storing gaseous substances comprises a closed tank and a feeding device, which comprises a passage through the tank wall, through which a gas can flow into the tank. In one or more embodiments, the tank has inside it at least one separating element, which is configured in such a way that the interior of the tank is divided into at least one pair of channels comprising two parallel running, channel-shaped compartments, the ends of which are in connection with one another in each case by way of a common space, each channel-shaped compartment being filled at least partially with an adsorption medium. According to the invention, the feeding device is designed in such a way that inflowing gas is diverted almost exclusively into one of the two compartments of each pair of channels.

In one or more embodiments, depending on the actual configuration of the sorption store according to the invention, it is not possible to rule out entirely the possibility of small amounts of inflowing gas flowing into a compartment other than the one intended, for example due to instances of turbulence or backflow. As used herein, the expression “almost exclusively” is, therefore, understood as meaning that a maximum of 10%, specifically a maximum of 5%, of the inflowing gas may flow into another compartment.

According to one or more embodiments, the division of the space inside the tank into channel-shaped compartments that are connected to one another in pairs, together with the design according to the invention of the feeding device, have the effect that a flow circulating through the channels occurs during the filling of the tank. This results in an improved heat transfer to the tank wall, which is usually cooled during filling and/or heated during emptying. In one or more embodiments, as a consequence of quicker cooling of the gas in the tank during filling, greater amounts of gas can be achieved in the same time, or shorter filling times can be achieved for the same amount of gas.

In one or more embodiments, a further improvement of the heat transfer can be achieved if, along with the tank wall, the at least one separating element, or in the case of a number of separating elements one or more of them, is/are cooled or heated. In an advantageous configuration of the invention, the at least one separating element or a number of separating elements, in particular all the separating elements that are present, are of a double-walled configuration, so that they can be flowed through by a heat transfer medium. In a further configuration of the invention, the channel walls of the channel-shaped compartments are of a double-walled configuration for being flowed through by a heat transfer medium. Depending on the arrangement of the at least one or the number of separating elements, a portion of the tank wall also forms a channel wall of a channel-shaped compartment or a number of channel-shaped compartments. In one or more embodiments, the tank wall is, in this case, also of a double-walled configuration. In a specific configuration, the entire tank wall including the end faces is designed for being flowed through by a heat transfer medium, in particular is of a double-walled configuration.

According to one or more embodiments, the choice of the wall thickness of the tank and the separating elements is dependent on the maximum pressure to be expected in the tank, the dimensions of the tank, in particular its diameter, and the properties of the material used. For an alloyed steel tank with an outside diameter of 10 cm and a maximum pressure of 100 bar, for example, the minimum wall thickness has been estimated at 2 mm (according to DIN 17458). The clearance between the double walls is chosen such that it can be flowed through by a sufficiently great volumetric flow of the heat transfer medium. In one or more embodiments, it is from 2 mm to 10 mm, specifically from 3 mm to 6 mm According to one or more embodiments, depending on the temperature range that is suitable for the cooling or the heating of the gas in the sorption store, various transfer media come into consideration, for example water, glycols, alcohols or mixtures thereof. Corresponding heat transfer media are known to a person skilled in the art.

In one or more embodiments, it has been found to be advantageous if the distance between the channel walls in each channel-shaped compartment is from 2 cm to 8 cm. As used herein, the distance should be understood as meaning the shortest distance between two points of opposing walls in cross section perpendicularly to the axis of the channel. In the case of a channel with a circular cross section, for example, the distance corresponds to the diameter; in the case of an annular cross section, it corresponds to the width of the ring and, in the case of a rectangular cross section, it corresponds to the shorter distance between the parallel sides. In particular, in the case where all the channel walls are cooled or heated, the stated range has proven to be a good compromise between heat transfer and filling volume of the adsorption medium. With greater distances, the heat transfer between the adsorption medium and the wall deteriorates; with smaller distances, the filling volume of the adsorption medium for given outer dimensions of the tank is reduced. Moreover, the weight of the sorption store and its production costs increase, which is disadvantageous in particular in the case of mobile applications.

In a specific configuration, the distances between the channel walls in the channel-shaped compartments of each pair of channels differ by no more than 40%, specifically by no more than 20%, from one another. In one or more embodiments, the distances between the channel walls in all the channel-shaped compartments differ by no more than 40%, specifically by no more than 20% from one another. Such a design is conducive to the uniform removal of heat during filling or uniform supply of heat during the emptying of the tank.

In a further specific configuration, the cross-sectional areas of the channel-shaped compartments are chosen such that, during the filling of the tank with gas, the flow rates in the channel-shaped compartments of each pair of channels differ by no more than 20% from one another. In a specific embodiment, the flow rates in all the channel-shaped compartments differ by no more than 20% from one another.

As explained further below, on the basis of the examples, the requirements mentioned for distances between walls that are as equal as possible and cross-sectional areas of the channel-shaped compartments that are as equal as possible may conflict with one another, depending on the actual geometrical design of the tank. In such a case, the configuration with distances between the walls that are as equal as possible is preferred, since the effect of the uniform removal of heat has proven to be dominant over the flow effect, in particular when emptying the tank.

According to one or more embodiments, when viewed in cross section, the contours of the tank inner wall and of the at least one separating element are substantially conformal. In one or more embodiments, if a number of separating elements are present, the contours of all the separating elements are conformal to the contour of the tank inner wall. As used herein, conformal means that the contours coincide in their form, for example are all circular, all elliptical, or all rectangular. As used herein, the expression "substantially conformal" is understood as meaning that small deviations from the basic form are still regarded as coinciding. Examples are rounded corners in the case of a rectangular basic form or deviations within the limits of production tolerances.

In an embodiment according to the invention, the tank of the sorption store is cylindrically designed, and the at least one separating element is arranged substantially coaxially in relation to the cylinder axis. Embodiments in which the longitudinal axis of the at least one separating element is inclined by a few degrees to a maximum of 10 degrees with respect to the cylinder axis are still regarded as "substantially" coaxial. This configuration ensures that the channel cross sections vary only little along the cylinder axis, so that a uniform flow over the length of the channel can form.

According to one or more embodiments, depending on the installation space available and the maximum admissible pressure in the tank, different cross-sectional areas are suitable for the cylindrical tank, for example circular, elliptical or rectangular. Irregularly shaped cross-sectional areas also come into consideration, for example if the tank is to be fitted into a hollow space of a vehicle body. For high pressures above about 100 bar, circular and elliptical cross sections are suitable in particular.

In one or more embodiments, the at least one separating element is formed as a tube, so that the space inside the tube forms a first channel-shaped compartment and the space between the tube outer wall and the tank inner wall or possibly between the tube outer wall and a further separating element forms a second, annular-channel-shaped compartment. In one or more embodiments, the cross-sectional areas of the tank and of the tubular separating element have the same form, for example both circular or both elliptical. In a development of this configuration according to the invention, a number of separating elements are present, all formed as tubes with different diameters and arranged coaxially. In specific embodiments, their cross-sectional areas are of the same form.

In one or more embodiments, the feeding device comprises at least one passage through the tank wall, through which a gas can flow into the tank, and is designed in such a way that inflowing gas is diverted almost exclusively into one of the two compartments of each pair of channels. In a specific configuration, the feeding device comprises a tubular supply line, the one end of which is connected to the at least one passage and the other end of which is located in a channel-shaped compartment. Alternatively, the other end may also be located at a distance from the end-face channel inlet of the compartment, the distance being dimensioned in such a way that the gas emerging from the end of the line flows almost exclusively into this compartment.

In a further advantageous configuration, the feeding device comprises components which distribute the gas flowing in through the at least one passage in a directed manner to one compartment of each pair of channels, for example a deflecting element or a distributor device.

In a specific configuration of the sorption store according to the invention, the feeding device comprises a tubular supply line, the one end of which is connected to the at least one passage. The supply line runs through a first compartment and its other end opens out into the common space, by way of which the compartments are in connection. In a further design of the invention, the tubular supply line is perforated in the region in which it runs through the first compartment, so that the inflowing gas flows partially into this first compartment. By this measure, a more uniform adsorption, and as a result a more uniform temperature profile along the channel-shaped compartment, can be achieved, in particular at the beginning of the filling operation, before the circulating flow has fully formed.

According to one or more embodiments, the feeding device may also comprise means for influencing the gas flow, for example throttle valves or control valves. These means may be provided inside or outside the tank. In one or more embodiments, tt is also possible for a number of passages to be provided in the tank wall, for example in order to feed the gas to the channel-shaped compartments at a number of points or in order to provide different passages for the filling with gas and removal of gas. In specific embodiments, the same passage or the same passages is/are used for the removal of gas as for the filling of the tank with gas.

Various materials are suitable as the adsorption medium. In one or more embodiments, the adsorption medium comprises zeolite, activated carbon, or metal-organic frameworks.

In one or more embodiments, the porosity of the adsorption medium is at least 0.2. As used herein, the porosity is defined as the ratio of void volume to total volume of any subvolume in the tank. At a lower porosity, the pressure drop on flowing through the adsorption medium increases, which has an adverse effect on the filling time.

In a specific configuration of the invention, the adsorption medium is in the form of a bed of pellets, and the ratio of the permeability of the pellets to the smallest pellet diameter is at least $10^{-14}$ $m^2/m$. In one or more embodiments, the rate at which the gas penetrates the pellets during filling is dependent on how quickly the pressure in the interior of the pellets approaches the pressure on the outside of the pellets. With decreasing permeability and with increasing diameter of the pellets, the time required for this pressure equalization, and thus also the charging time of the pellets, increases. This may have a limiting effect on the overall process of filling and discharging.

According to one or more embodiments, the common spaces that connect the respective channel-shaped compartments are designed in such a way that the distance between the ends of the separating elements forming the channel-shaped compartments and the respective inner sides of the tank wall is at least double the smallest pellet diameter. In one or more embodiments, this distance is also no greater than one tenth of the length of the separating element concerned in the longitudinal direction of the channel. Such a design of the common spaces has an advantageous effect on the formation of a circulating gas flow through the connected compartments.

A further aspect of the invention is directed to a method for filling a sorption store according to the invention with a gas, in a first step gas being supplied in an amount such that a pressure in the store of at least 30% of a predetermined final pressure is reached as quickly as possible, and subsequently in a second step the supplied amount of gas being varied in such a way that the variation of the pressure in the store approximates to the adsorption kinetics of the adsorption medium until the predetermined final pressure in the store is reached after a predetermined time period.

For filling, sorption stores such as those known from the prior art are usually connected to a pressure line, from which the gas to be stored flows at constant pressure into the store, until the pressure in the store has reached a predetermined final pressure. However, it has been found that the time required for filling can be reduced significantly if the filling is carried out according to the method according to the invention.

According to one or more embodiments, in the sorption store, gas is stored both by adsorption on the adsorption medium and in the voids between and in individual particles of the adsorption medium or in regions of the tank that are not filled with adsorption medium. During the first step of the method according to the invention, initially the voids are filled with gas. With virtually no time lag, the pressure in the store follows the pressure of the gas that flows into the tank. In one or more embodiments, in order to minimize the total time required for the filling operation, this first step should be carried out as quickly as possible, for example by introducing the gas at a pressure which corresponds to at least 30% of the predetermined final pressure right at the beginning of the filling operation.

During the first step, part of the gas is already adsorbed, as a result of which the temperature of the adsorption material, and thus also of the gas flowing over it, increases. In the second step, the variation of the pressure in the tank approximates to the adsorption kinetics of the adsorption medium. Methods for determining the adsorption kinetics are known to those skilled in the art, for example with the aid of pressure jump experiments or adsorption balances (for example in "Zhao, Li and Lin, Industrial & Engineering Chemistry Research, 48(22), 2009, pages 10015-10020").

Adsorption kinetics is understood as meaning the variation of the adsorption of the gas on the adsorption medium over time under isothermal and isobaric conditions. This variation can often be approximated by an exponentially decaying function which at the beginning displays a sharp rise and then becomes ever flatter as it converges toward a final value. An example of such an approximation is the function a. $(1-C^{-bt})$, where a and b are positive constants. The adsorption kinetics may also be approximated by other functions, for example a concave function, a function which is constant in sections, a function which is linear in sections or a linear function which joins the initial value and the final value.

A variation of pressure in the store that approximates to the adsorption kinetics has the effect that the flow rate of the gas in the store is greater than the rate at which the gas is adsorbed. This results in the formation of circulating flows through the channel-shaped compartments, which ensure that the heat produced during the adsorption can be removed more quickly. The thermal conductivity of the adsorption medium in the tank is increased, whereby the time requirement for filling the store is reduced.

In one or more embodiments, the supplied amount of gas can be varied, for example, by adapting the inlet pressure appropriately to the approximation function, for example by appropriate valve connections.

In the case of an advantageous configuration of the method according to the invention, the variation of pressure in the store is approximated to the adsorption kinetics in the form of pressure oscillations, in particular by appropriate variation of the inlet pressure. In one or more embodiments, the maximum value of the oscillation corresponds to the final pressure, and the minimum value of the oscillation is approximated to the variation of the adsorption kinetics. This corresponds to a reduction in the oscillation amplitude over time. At the end of the predetermined time period, the predetermined final pressure in the store is set. The oscillation may be, for example, sinusoidal, sawtooth-shaped or alternately constant in sections. The form of the oscillation and also its amplitude and period are adapted to the actual adsorption kinetics.

An example of a function which approximates the pressure oscillation to the adsorption kinetics is:

$$p=p0+\Delta p\cdot f(a)\cdot(\sin(2\cdot\pi\cdot k\cdot t)-1),\text{ where}$$

p0 is the initial pressure, p is the difference between the initial pressure and the final pressure, k is the frequency and f(a) is a damping function. The damping may, for example, decrease linearly or decrease exponentially. An example is the function f(a)=a/(t+a), where a is a positive number. The frequency k can be estimated by way of the isothermal and isobaric adsorption kinetics $t_{kin}$, which are a measure of the minimum filling time. In one or more embodiments, the frequency is chosen such that from two to ten oscillation periods lie within $t_{kin}$. At a greater number of cycles, less heat can be removed per cycle, so that the energy consumption required for providing the pressure oscillations becomes uneconomical.

The time required for filling a sorption store is influenced significantly by the material properties of the adsorption medium, in particular its adsorption kinetics. A further influencing factor is the maximum temperature to be expected during filling, which likewise depends on the material properties, in particular the enthalpy of adsorption. In one or more embodiments, the choice of the initial pressure and the type of pressure increase are adapted to the respective adsorption kinetics, the enthalpy of adsorption and the heat conduction to the walls. In the case of a quick removal of heat of the liberating enthalpy of adsorption, higher initial pressures are advantageous, in order to minimize the total filling time required. In one or more embodiments, depending on the adsorption kinetics and heat removal, the initial pressures are in the range from 30% to 90% of the predetermined final pressure, with an initial pressure that is as high as possible being chosen. The level of the initial pressure is possibly limited by the temperature increase established during the adsorption.

According to one or more embodiments, it tends to be advantageous to choose a pressure difference between the initial pressure and the final pressure to be all the greater the slower the removal of heat. In one or more embodiments, the rate at which the pressure increases is at least 1 bar per minute of filling time, in order to promote the formation of a circulating flow in the channel-shaped compartments.

In the case of a specific configuration of the method according to the invention, the temperature of the gas stream is measured in at least one channel-shaped compartment and, if required, the amount of gas supplied to the sorption store is adapted in such a way that a predetermined maximum temperature in the channel-shaped compartment is not exceeded.

In one or more embodiments, the time period required for the filling can be reduced further if the gas is supplied in a cooled state.

A further aspect of the invention is direct to a method for removing gas from a sorption store according to the invention, the channel walls being flowed through by a heat transfer medium, the temperature of which is greater than the temperature of the gas in the channel-shaped compartments.

In comparison with the prior art, the sorption store according to the invention makes it possible for heat to be transported more quickly out of the adsorption medium or into the adsorption medium. This significantly reduces the time required for filling the store with a given amount of gas. Alternatively, the store can be filled with a greater amount of gas in a given time. When removing gas from the store, the invention makes it possible for gas to be provided quickly and constantly. The sorption store according to the invention is of a simple structural design and, as a result of its compact type of construction, is particularly suitable for mobile applications, for example in motor vehicles. The embodiment with double-walled channel walls has the additional advantage that, for changing over from cooling to heating, the heat transfer medium merely has to be changed or its temperature altered appropriately. Consequently, this embodiment is suitable in mobile use for filling the tank and driving the vehicle equally.

The invention is further explained below on the basis of the drawings, where the drawings should be understood as basic representations. They do not represent any restriction of the invention, for example with regard to actual dimensions or configurational variants of components. For better clarity, they are generally not to scale, especially in respect of length and width ratios.

LIST OF THE REFERENCE NUMERALS USED IN THE FIGURES.

10 . . . Tank
11 . . . Tank wall
15 . . . Separating element
16 . . . Separating element
17 . . . Separating element
20 . . . Feeding device
21 . . . Passage
22 . . . Deflecting element
30 . . . First compartment
31 . . . Second compartment
32 . . . Third compartment
33 . . . Fourth compartment
35 . . . (Upper) common space
36 . . . (Lower) common space
37 . . . (Upper) common space
38 . . . (Lower) common space
40 . . . Adsorption medium
5*x* . . . Method steps for determining the initial pressure FIGS. 1 to 6 show diagrammatic sectional drawings of sorption stores according to one or more embodiments of the invention. The sorption stores shown by way of example have a substantially cylindrical tank 10. The upper illustrations in each case represent longitudinal sections through the cylinder axis, the lower illustrations in each case represent corresponding cross sections perpendicularly to the cylinder axis.

FIG. 1 shows a specific embodiment of a sorption store according to the invention. Referring to FIG. 1, The tank 10 has a circular cross section and has at one of its end faces a passage 21 through the tank wall. Inside the tank 10 there is a separating element 15, which is designed as a tube with a circular cross section and is arranged coaxially in relation to the cylinder axis. The space inside the tube forms a first channel-shaped compartment 30. The space between the outer wall of the tube and the tank inner wall forms a second, annular-channel-shaped compartment 31. The separating element 15 is at a distance from both end faces of the tank, so that the first and second compartments 30, 31 are in connection with one another at their ends by way of a respective common space 35, 36. In the example represented, the two compartments 30, 31 and the common space 36 opposite from the passage 21 are completely filled with an adsorption medium 40. The common space 35, which is in connection with the passage 21, is not filled with adsorption material. Provided in it is a deflecting element 22, which is designed in such a way that inflowing gas is diverted almost exclusively into the outer compartment 31. In the example represented, the deflecting element 22 is designed as a baffle plate in the form of a straight circular cone, the vertex of which is located in the cylinder axis. The deflecting element 22 is at a distance in the axial direction both from the end-face tank inner wall and from the separating element 15.

The dashed-line arrows symbolize the gas flow within the tank. Inflowing gas is diverted by means of the deflecting element 22 into the outer compartment 31 and flows down. By way of the common space 36, the gas flows up again through the inner compartment 30. In the common space 35, the rising gas is diverted again on the underside of the deflecting element 22 in the direction of the outer compartment 31, so that there forms a circulating gas flow through the two compartments 30, 31 and the two common spaces 35, 36.

Figure 2:
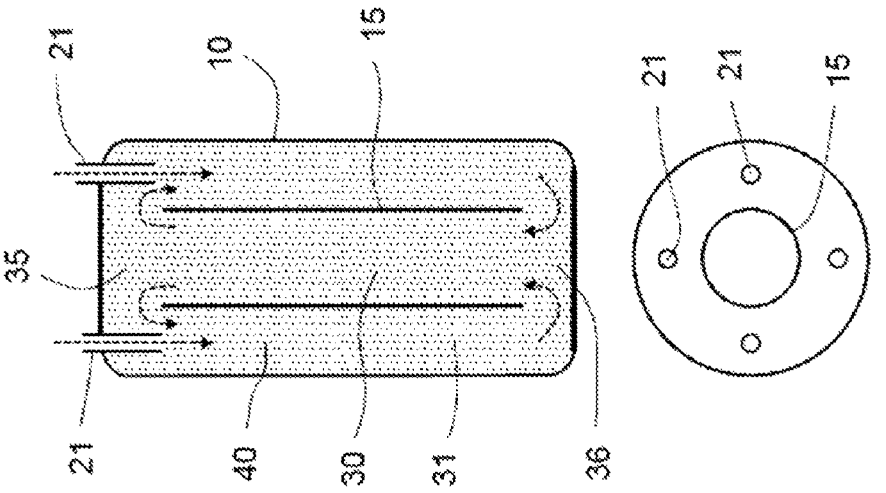
FIG. 2: shows an embodiment of a sorption store according to the invention with a number of passages

FIG. 2 shows a sorption store according to one or more embodiments the invention. Referring to FIG. 2, as in the first example, the tank 10 has a circular cross section, and a tubular separating element 15 is arranged inside the tank coaxially in relation to the cylinder axis. The pair of channels is formed by the space inside the separating element 15 as the first channel-shaped compartment 30 and the space between the tube outer wall and the tank inner wall as the second, annular-channel-shaped compartment 31. At the end faces of the tank, the two compartments 30, 31 are connected to one another by way of a respective common space 35, 36. In this example, the entire interior volume of the tank is filled with adsorption medium 40. The feeding device comprises four passages 21 through the tank wall, through which gas can flow into the space inside the tank. The passages 21 are located on an end face of the tank 10, are formed as tubes and are arranged such that they are uniformly distributed over the circumference in the region of the annular, outer compartment 31. They protrude so far into the common space 35 that inflowing gas is diverted almost exclusively into the outer compartment 31. Alternatively, the ends of the passage tubes 21 may also be provided in the outer compartment 31.

The dashed-line arrows symbolize the gas flow within the tank. Inflowing gas is diverted through the passages 21 onto the end face of the outer compartment 31 or into the outer compartment 31. It flows down through the common space 36 and up again in the inner compartment 30. Through the common space 35, the gas flows again into the outer compartment 31, so that there forms a circulating gas flow.

Figure 3:
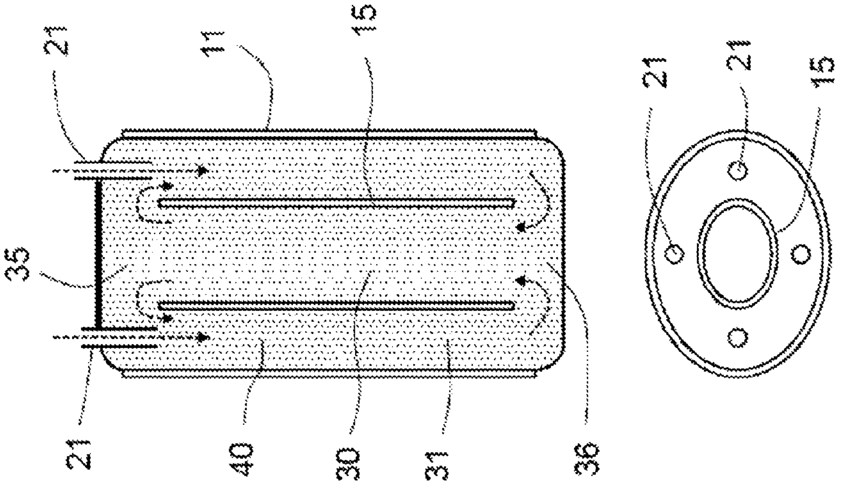
FIG. 3: shows an embodiment of a sorption store according to the invention with double-walled channel walls and an elliptical cross-sectional area of the tank

In FIG. 3, a variant of the sorption store according to FIG. 2 is represented. Referring to FIG. 3, in this case, the cross sections of the tank and of the separating element 15 are elliptical, the tubular separating element being aligned coaxially in relation to the cylinder axis. The channel walls of the channel-shaped compartments 30 and 31, which are formed by the tank wall 11 and the separating element 15, are of a double-walled configuration, in order to make it possible for a heat transfer medium to flow through. Corresponding inflow and outflow connections for a heat transfer medium are provided, but are not represented in the illustration.

Figure 4:
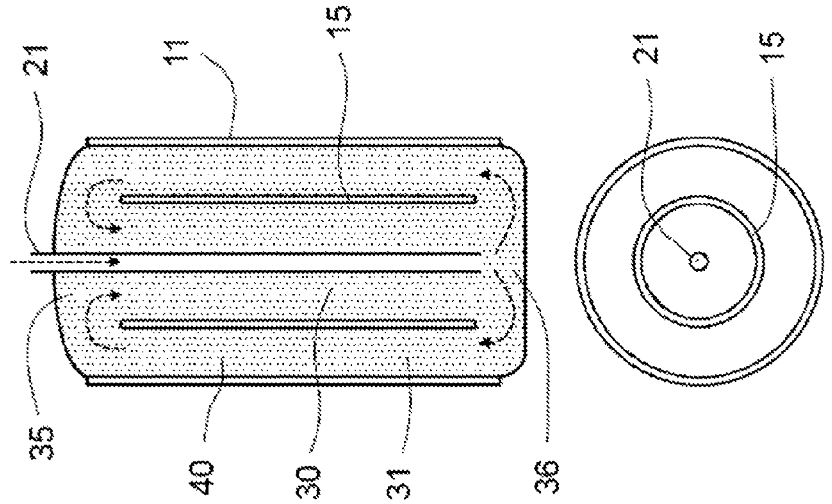
FIG. 4: shows an embodiment of a sorption store according to the invention with a feeding tube passing right through FIG. 5: shows an embodiment of a sorption store according to the invention with three channel-shaped compartments

FIG. 4 shows a sorption store according to a specific embodiment of the invention. Referring to FIG. 4, a separating element 15 is arranged inside the tank coaxially in relation to the cylinder axis, the cross sections are circular. The channel walls, which are formed by the tank wall 11 and the separating element 15, are of a double-walled configuration, in order to make it possible for a heat transfer medium to flow through. Provided on one end face of the tank is a passage 21 through the tank wall, which is designed in the form of a tube. The tube runs coaxially through the inner channel-shaped compartment 30 and ends in the common space 36 at the end face of the tank opposite from the passage 21. The space inside the tank is completely filled with an adsorption medium.

In this illustration too, the dashed-line arrows symbolize the path of the gas flow in the tank. Inflowing gas leaves the central tube into the common space 36 and flows laterally into the outer compartment 31, and there from the bottom up into the common space 35. From there, it flows from the top down through the inner compartment 30, so that there forms a circulating flow through the channel-shaped compartments 30, 31 and the common spaces 35, 36.

Figure 5:
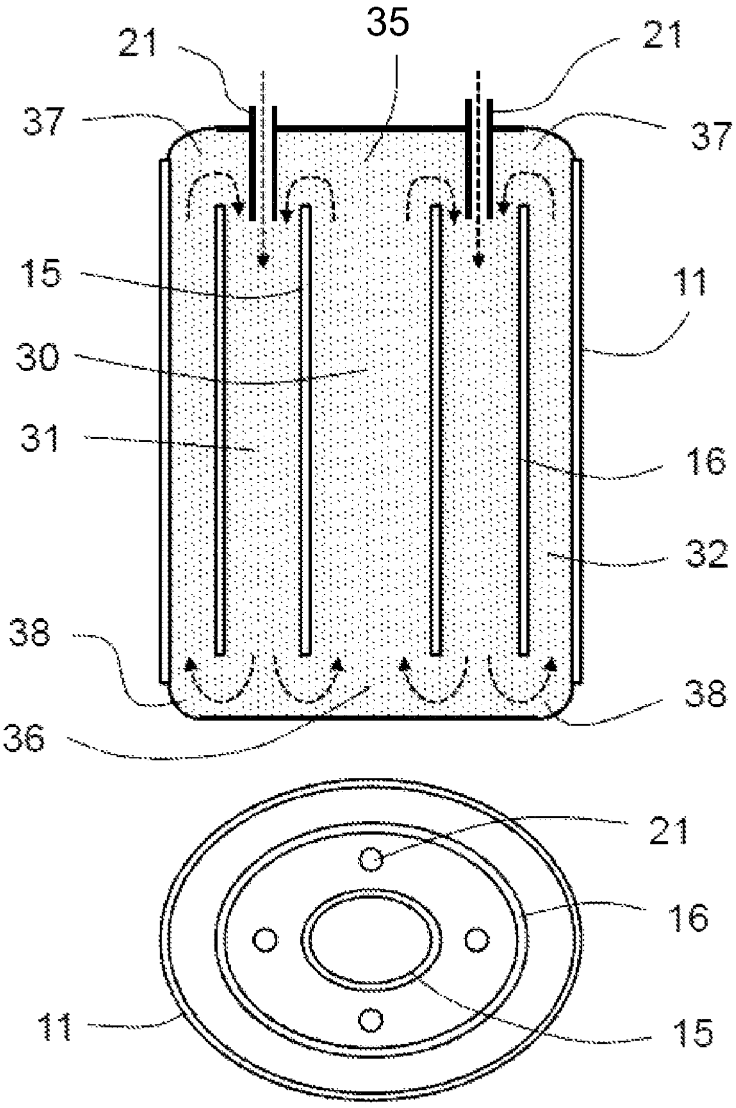

In FIG. 5 a sorption store according to one or more embodiments of the invention is represented, one in which the space inside the tank is divided by two coaxially arranged, tubular separating elements 15, 16 into three channel-shaped compartments 30, 31, 32. The cross sections of the tank and of the separating elements 15, 16 are elliptical in this example. As in all the previous examples, the separating elements are at a distance from both end-face tank inner walls. In the case of this embodiment, two common spaces 35, 37 at the end face in which the passages 21 for the gas are provided and two common spaces 36, 38 at the opposite end face are obtained. The common spaces 35 and 36 connect the channel-shaped compartments 30 and 31, the common spaces 37 and 38 connect the channel-shaped compartments 31 and 32. The compartment 30 and the common spaces 35 and 36 are substantially cylindrical, the compartments 31 and 32 and also the common spaces 37 and 38 are substantially hollow-cylindrical. The common spaces 35 and 37 on the one hand and 36 and 38 on the other hand cannot be strictly separated from one another, but are a result of the gas flow, as will be explained in more detail below. For better heat transfer, the tank wall 11 and the separating elements 15, 16 are of a double-walled configuration for being flowed through by a heat transfer medium. In this example, four passages 21 are provided, configured as tubes and arranged such that they are uniformly distributed over the circumference. The ends of the tubes protrude so far into the space inside the tank that inflowing gas is diverted almost exclusively into the middle compartment 31. The space inside the tank is completely filled with an adsorption medium.

The dashed-line arrows symbolize the gas flow within the tank. Inflowing gas is diverted almost exclusively into the middle compartment 31, and flows down there. At the exit from the middle compartment 31, the gas flow divides into a first component, which flows through the common space 36 into the inner compartment 30 and up there, and a second component, which flows through the common space 38 into the outer compartment 32 and up there. In the upper part of the tank, the first and second components of the gas flow meet one another and flow through the common space 35 or the common space 37 together again into the middle compartment 31 and down there. The common spaces 35 and 37 at the upper end and common spaces 36 and 38 at the lower end of the tank go over into one another. Their limits cannot be exactly localized, since they are influenced by the gas flow. However, the common spaces are in any case present and distinguishable from one another.

In order to influence the gas flow more specifically, deflecting elements may be provided for example at the end face on the inlet side, so that, according to FIG. 5, gas flowing up through the compartments 30 and 32 is diverted into the compartment 31. To improve the heat transfer, further components for heat transmission may also be provided, for example a central tube that runs along the cylinder axis in the compartment 30. It goes without saying that such measures may also be advantageously provided in the case of embodiments other than that represented in FIG. 5.

Figure 6:
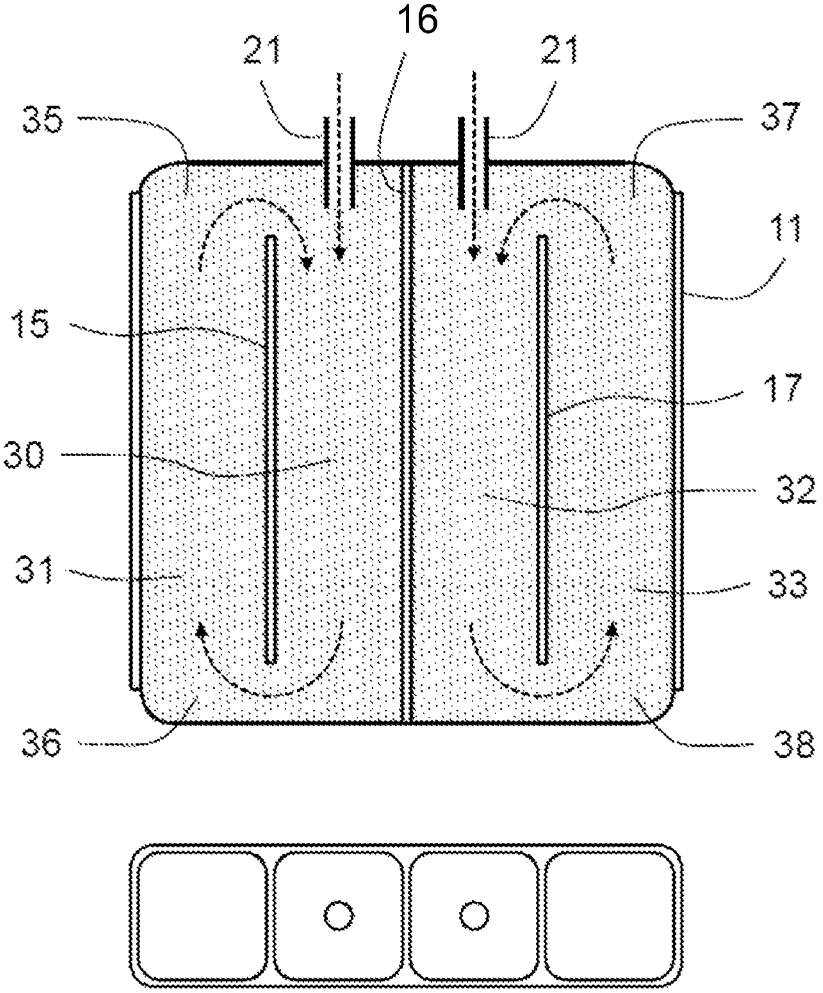
FIG. 6: shows an embodiment of a sorption store according to the invention with a rectangular tank cross section

FIG. 6 shows a further specific embodiment of a sorption store according to the invention. Referring to FIG. 6, the tank is of a cylindrical form with a substantially rectangular cross section. The corners are of a rounded configuration, the tank wall 11 double-walled for being flowed through by a heat transfer medium. The interior of the tank is divided by three separating elements 15, 16, 17 into four channel-shaped compartments 30 to 33. The separating elements are arranged such that they are uniformly distributed in the longitudinal direction of the tank, so that rectangular cross sections with substantially identical area contents are likewise obtained for the compartments. In the example represented, the cross sections of the compartments are square with rounded corners. The separating elements are configured as double-walled plates and run coaxially in relation to the cylinder axis. In the transverse direction, the separating elements in each case reach up to the inner wall of the tank and are connected to it. The middle separating element 16 is also connected at the end faces to the tank inner walls in the axial direction of the tank, so that two completely separate pairs of channels are obtained in the tank.

The first pair of channels comprises the channel-shaped compartments 30 and 31, which run parallel and are in connection with one another at the end faces by way of the common spaces 35 and 36. The second pair of channels comprises the parallel running, channel-shaped compartments 32 and 33, which are connected to one another at the end faces by way of the common spaces 37 and 38. A passage 21 through an end tank wall, through which the gas can flow into the tank, is provided for each pair of channels. The passages 21 are of a tubular configuration and are arranged such that inflowing gas is diverted almost exclusively into one of the two compartments of each pair of channels. In the example represented, these are the compartment 30 for the first pair of channels and the compartment 32 for the second pair of channels. All of the channel-shaped compartments and also the common spaces are filled with an adsorption medium.

The dashed-line arrows symbolize the gas flow within the tank. Inflowing gas is diverted almost exclusively into the compartments 30 and 32. Through these compartments it flows through the respective common spaces 36 and 38 into the compartments 31 and 33, respectively. From there, it flows through the inlet-side common spaces 35 and 37 again into the compartments 30 and 32, respectively, so that two circulating gas flows are obtained. In the example represented, the two pairs of channels 30/31 and 32/33 are completely separate. However, the invention also covers configurational variants in which, for example, the separating element 16 does not extend up to the end faces, so that the common spaces 37 and 37 and also 36 and 38 are respectively in connection. Also in such a case, two circulating flows according to the invention would be obtained.

As already stated above, in a specific configuration the distances between the channel walls in the channel-shaped compartments of each pair of channels do not differ by more than 40%, specifically by more than 20%, in order to be conducive to a uniform removal of heat during filling or supply of heat during the emptying of the tank. In a further specific configuration, the cross-sectional areas of the channel-shaped compartments are chosen such that, during the filling of the tank with gas, the flow rates in the channel-shaped compartments of each pair of channels differ by no more than 20% from one another. As already explained, these requirements mentioned as specific, for distances between walls that are as equal as possible and cross-sectional areas of the channel-shaped compartments that are as equal as possible, may conflict with one another, depending on the actual geometrical design of the tank. In such a case, the configuration with distances between the walls that are as equal as possible is preferred, since the effect of the uniform removal of heat has proven to be dominant over the flow effect, in particular when emptying the tank. The embodiments according to FIGS. 1, 2, 3, and 5 are examples of such designs.

The embodiment according to FIG. 6 is an example of a sorption store according to the invention in which both criteria can be satisfied simultaneously. On account of the square cross-sectional form of the sub-channels, both the distances between their walls and their cross-sectional areas are equal. These in turn are proportional to the flow rate of the gas through the sub-channels, so that the flow rates in the sub-channels are also approximately equal.

Figure 7:
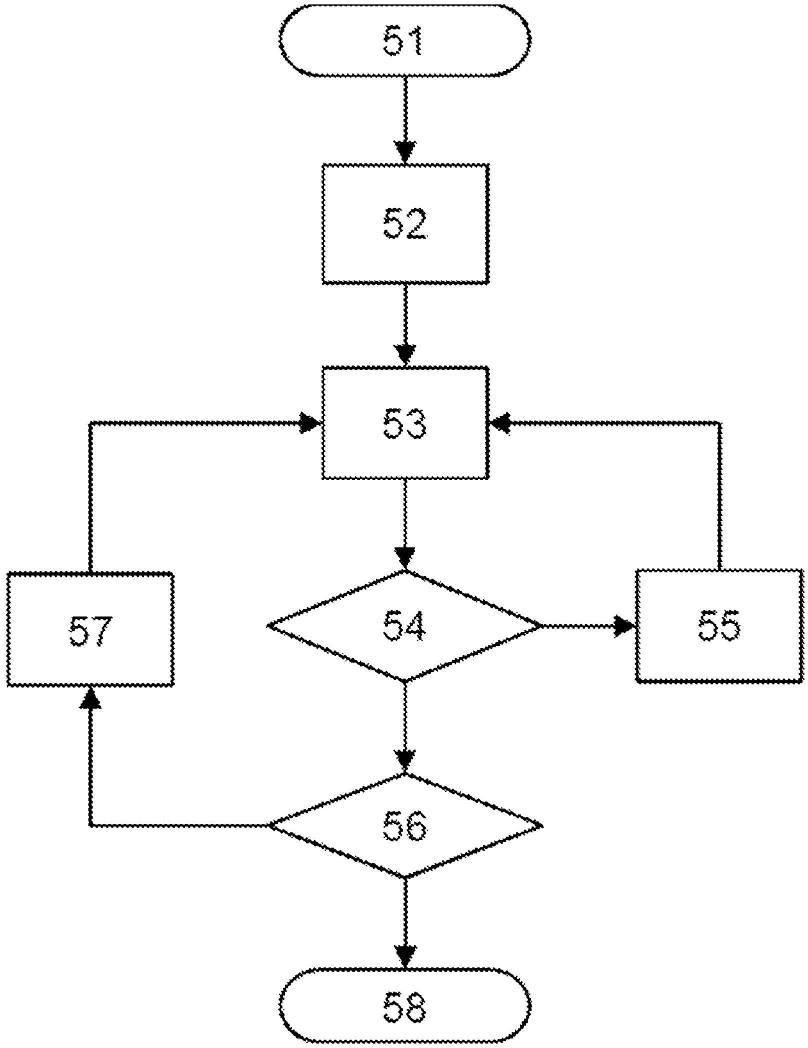
FIG. 7: shows an example of a flow diagram for determining the initial pressure for the filling according to the invention of a sorption store

FIG. 7 shows by way of example a flow diagram for determining the initial pressure $p_0$ for the filling according to the invention of a sorption store. After the start 51, a starting value for the initial pressure $p_0$, for example 50% of the final pressure to be reached, is first chosen in the initializing phase 52. Furthermore, an upper limit for the temperature $T_{max}$ that is admissible in the store and also the desired end time $t_0$ of the filling, for example five minutes, are prescribed.

Step 53 comprises the actual carrying out of the test. An empty sorption store is filled with gas, the pressure of which at the inlet to the store is constantly $p_0$, from the starting time to the time $t_0$, which is set for example to one minute. Over the time period from $t_0$ to the end time $t_e$, the pressure at the inlet to the store is increased according to a predetermined function which approximates to the variation of the adsorption kinetics of the adsorption medium used.

The maximum temperature reached during the charging operation is compared in step 54 with the predetermined upper limit $T_{max}$. If the upper limit is exceeded, the initial pressure $p_0$ is reduced in step 55, for example by a predetermined value, a predetermined percentage or as an interval nesting. However, the pressure should not go below the minimum pressure amounting to 30% of the final pressure. A renewed test (step 53) at the reduced initial pressure is subsequently carried out.

However, if the predetermined upper temperature limit $T_{max}$ was not reached, it is checked in the next step 56 whether the complete charging of the store with gas at the end time $t_e$ is satisfactory. The criterion may be, for example, a complete charging of at least 95% of the maximum uptake capacity. If the charging is not yet satisfactory, a further iteration is carried out, in which the initial pressure $p_0$ is increased in step 57. The pressure may be increased, for example, by a predetermined value, a predetermined percentage or as an interval nesting. A renewed test (step 53) at the increased initial pressure is subsequently carried out.

If both the temperature criterion (step 54) is satisfied and the complete charging is satisfactory, the test program is ended (step 58). In this way, an optimum value for the initial pressure can be determined in a few, specific tests. The tests are simple to carry out and are required only once for the design of an actual sorption store. In an analogous way, or else in combination with the sequence described above, the feeding strategy from the initial pressure to the final pressure can be established or optimized.

The invention is now described with reference to the following examples.

EXAMPLES

Results of simulation calculations carried out with the program OpenFOAM (from the ENGYS company) are shown below. The calculations are based on the following assumptions:

- The bed of pellets may be regarded as a porous medium and as a homogeneous phase separate from the gas phase. It is thus not necessary for each individual pellet to be numerically resolved.
- All the pellets have the same properties in respect of size, permeability, density, heat capacity, conductivity, and enthalpy of adsorption and adsorption kinetics.
- The flow effects in respect of the heat conduction of the bed can be described by known correlations (for example VDI-Warmeatlas (VDI Heat Atlas), 10th edition, Springer-Verlag, Heidelberg 2006, Section Mh3).

A cylindrical tank with a circular cross section, an inner longitudinal extent of 100 cm and an inside diameter of 17 is considered. In a way similar to in the case of the example according to FIG. 4, a tube with a circular cross section is provided concentrically in relation to the cylinder axis inside the tank as a separating element. It is of a double-walled configuration with an inside diameter of 5 cm. Its wall thickness is altogether 1 cm, the gap width between the walls of the double wall is 3 mm The interior of the tank is consequently divided into a pair of channels comprising two parallel running, channel-shaped compartments. The distances between the channel walls in both compartments are in each case 5 cm. The distance between the ends of the tube and the respective inner surfaces at the end faces of the tank is 1 cm. The tank wall is likewise of a double-walled configuration, with a wall thickness of altogether 1 cm; the gap width between the walls of the double wall is 3 mm.

The tank has a filling volume of 19 liters and is filled with pellets of a metal-organic framework (MOF) of the type 177 as the adsorption medium The MOF type 177 consists of zinc clusters, which are bonded by way of 1,3,5-tris(4-carboxyphenyl)benzene as an organic linker. The specific surface area (Langmuir) of the MOF lies between 4000 and 5000 $m^2/g$. Further details about this type can be found in patent specification U.S. Pat. No. 7,652,132 B2, which is herein incorporated by reference in its entirety. The pellets are cylindrically formed with a length of 3 mm and a diameter of 3 mm Their permeability is $3.10^{-16}$ $m^2$. Consequently, a value of $10^{-13}$ $m^2/m$ is obtained for the ratio of permeability to smallest pellet diameter. The porosity of the bed is 0.47.

As a departure from the representation in FIG. 4, the tube connected to the passage 21 does not run through the middle channel-shaped compartment 30, but merely protrudes by 8 cm into the tank. However, this configuration is sufficient for inflowing gas to be diverted almost exclusively into the middle compartment 30.

Filling of the tank with pure methane supplied at a temperature of 27° C. is investigated. The predetermined final pressure is 90 bar absolute. The tank wall and the respective separating elements are flowed through by a heat transfer medium in such a way that a constant wall temperature of 27° C. is obtained. Under these conditions, the tank can be filled with a maximum of 2 kg of methane.

Figure 8:
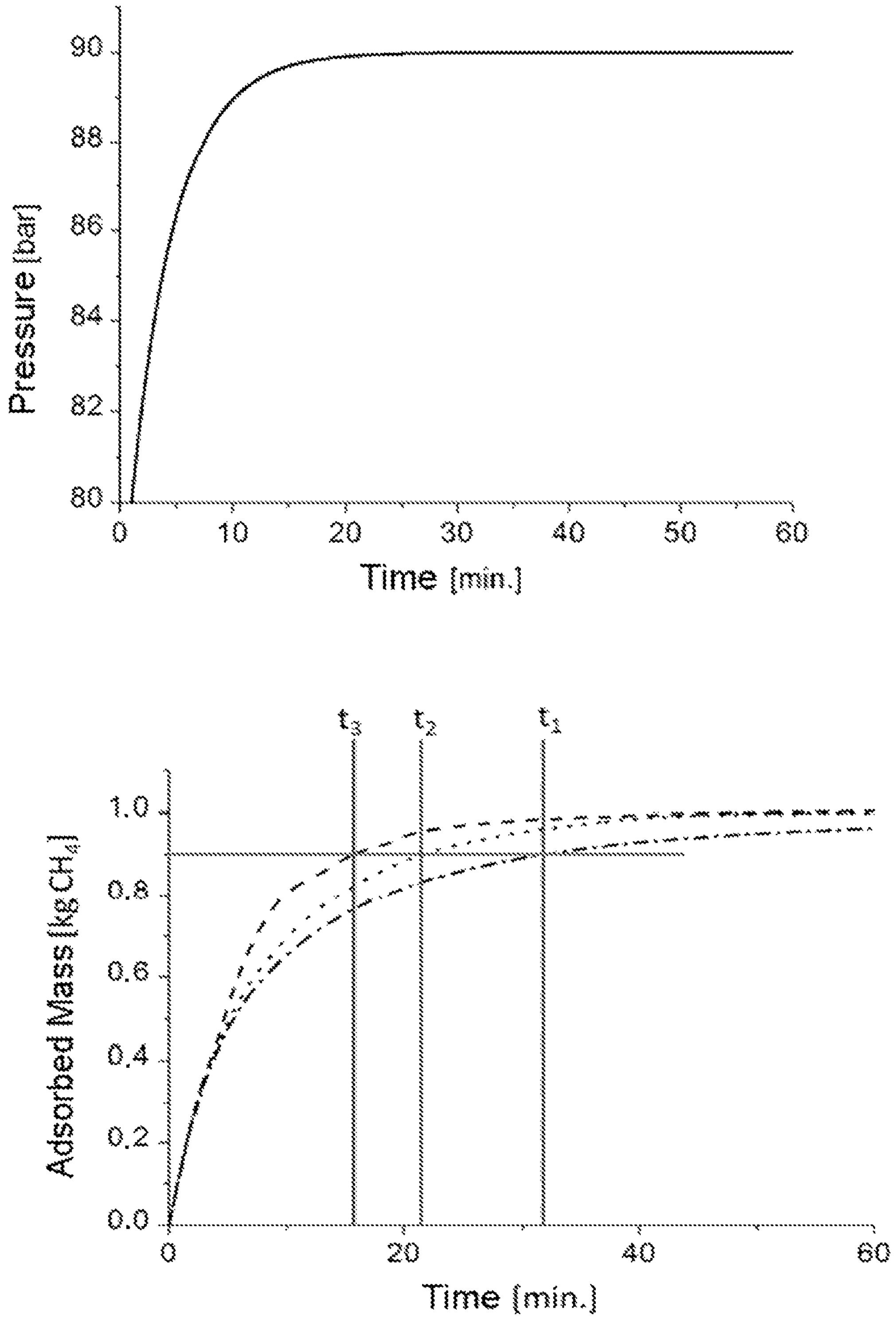
FIG. 8: shows a comparison of different tank configurations and filling strategies

In the lower diagram of FIG. 8, the results of three scenarios are presented. In the comparative scenario (dash-dotted curve), the gas is supplied to the tank described above under constant pressure of 90 bar from the beginning. The final pressure of 90 bar is reached in the tank within the first minute. After about 32 minutes, 0.9 kg of methane have been adsorbed (time $t_1$ in FIG. 8). At this time, the voids of the pellet bed are filled with a further kilogram of methane, so that 95% of the tank is charged with methane.

In the case of the first scenario according to the invention (dotted curve), the same tank configuration as in the comparative scenario is taken as a basis. However, at the beginning the gas is supplied at only 80 bar for a time period of one minute, until the internal tank pressure has increased to 80 bar. Subsequently, the inlet pressure of the supplied methane is increased to the final pressure of 90 bar over a time period of 20 minutes according to a function that has been adapted to the adsorption kinetics:

$$p(t)=p_0+\Delta p\cdot(1-e^{-kt}) \text{ with } p_0=80 \text{ bar}, \Delta p=10 \text{ bar and } k=0.0042 \text{ s}^{-1}.$$

The variation of pressure over time is represented in the upper diagram in FIG. 8. In the case of the tank considered, the simulated MOF type has a relatively quick removal of heat in relation to the adsorption kinetics, and therefore a value of about 90% of the final pressure is chosen as the initial pressure. Within the first minutes, a large part of the methane to be adsorbed is already adsorbed. The temperature of the adsorption medium thereby increases greatly.

It can be established from the simulation results that a flow circulating through the channel-shaped compartments is induced by this procedure according to the invention. The heat produced by the adsorption in the adsorption medium is removed more quickly to the cooled walls by the flow. This in turn has the effect that the adsorption takes place more quickly and 95% of the tank is charged with methane after only about 22 minutes (time $t_2$ in the lower diagram of FIG. 8).

In the case of the second scenario according to the invention (dashed curve), the tank configuration is modified to the extent that two tubular separating elements are arranged concentrically and coaxially in relation to the cylinder axis, so that three parallel running compartments are obtained. The configuration corresponds in principle to that represented in FIG. 5, but with circular cross sections. The inside diameter of the tank is 18.1 cm, its inner longitudinal extent 1 m. The double-walled separating elements have a total wall thickness of 1 cm, with an inner gap width of 3 mm The distances between the walls in all the channel-shaped compartments are 2.8 cm.

The feeding strategy corresponded to that described in the first scenario according to the invention; initially filling with an inlet pressure of 80 bar over a time period of half a minute, subsequently a linear increase in the inlet pressure up to the final pressure of 90 bar as an approximation to the adsorption kinetics of the MOF material. In the tank there forms a flow circulating through the channel-shaped compartments, which leads to a better removal of heat and quicker charging of the adsorption medium. In this case, the removal of heat is increased further by more cooling area being available with the further separating element. As a result, the time period until 95% of the tank is charged with methane is reduced, to about 16 minutes (time $t_3$ in the lower diagram of FIG. 8).

What is claimed is:

1. A sorption store for storing gaseous substances, comprising a closed tank and a feeding device, which comprises a passage through the tank wall, through which a gas can flow into the tank, wherein the tank has inside it at least one separating element, which is configured in such a way that the interior of the tank is divided into at least one pair of channels comprising two parallel running, channel-shaped compartments, both ends of which are in connection with one another in each case by way of distinct common spaces, each channel-shaped compartment being filled at least partially with an adsorption medium, and wherein the feeding device is designed in such a way that inflowing gas is diverted almost exclusively into one of the two compartments of each pair of channels.

2. The sorption store according to claim 1, wherein the channel walls of the channel-shaped compartments are of a double-walled configuration for being flowed through by a heat transfer medium.

3. The sorption store according to claim 1, wherein the distance between the channel walls in each channel-shaped compartment is from 2 cm to 8 cm.

4. The sorption store according to claim 1, wherein the distances between the channel walls in the channel-shaped compartments of each pair of channels differs by no more than 40%, from one another.

5. The sorption store according to claim 1, wherein the cross-sectional areas of the channel-shaped compartments is chosen such that, during the filling of the tank with gas, the flow rates in the channel-shaped compartments of each pair of channels differ by no more than 20% from one another.

6. The sorption store according to claim 1, wherein, when viewed in cross section, the contours of the tank inner wall and of the at least one separating element and, if applicable, the number of separating elements are substantially conformal.

7. The sorption store according to claim 1, wherein the tank is cylindrically designed and the at least one separating element is arranged substantially coaxially in relation to the cylinder axis.

8. The sorption store according to claim 7, wherein the at least one separating element is formed as a tube, so that the space inside the tube forms a first channel-shaped compartment and the space between the tube outer wall and the tank inner wall or possibly between the tube outer wall and a further separating element forms a second, annular-channel-shaped compartment.

9. The sorption store according to claim 1, wherein the porosity of the adsorption medium is at least 0.2.

10. The sorption store according to claim 1, wherein the adsorption medium is in the form of a bed of pellets, and the ratio of the permeability of the pellets to the smallest pellet diameter is at least $10^{-14}$ $m^2/m$.

11. The sorption store according to claim 1, wherein the adsorption medium comprises zeolite, activated carbon, or metal-organic frameworks.

12. A method for filling a sorption store according to claim 1 with a gas, wherein, in a first step, gas is supplied in an amount such that a pressure in the store of at least 30% of a predetermined final pressure is reached as quickly as possible, and wherein subsequently, in a second step, the supplied amount of gas is varied in such a way that the variation of the pressure in the store approximates to the adsorption kinetics of the adsorption medium until the predetermined final pressure in the store is reached after a predetermined time period.

13. The method according to claim 12, wherein the temperature of the gas stream is measured in at least one channel-shaped compartment and the amount of gas supplied to the sorption store is adapted as required in such a way that a predetermined maximum temperature in the channel-shaped compartment is not exceeded.

14. A method for removing gas from a sorption store according to claim 2, wherein the channel walls are flowed through by a heat transfer medium, the temperature of which is greater than the temperature of the gas in the channel-shaped compartments.

15. The method according to claim 12, wherein the gas substantially comprises methane.

* * * * *